US010169922B2

(12) United States Patent
Kipman et al.

(10) Patent No.: US 10,169,922 B2
(45) Date of Patent: Jan. 1, 2019

(54) REALITY MIXER FOR MIXED REALITY

(71) Applicant: MICROSOFT TECHNOLOGY LICENSING, LLC, Redmond, WA (US)

(72) Inventors: Alex Kipman, Redmond, WA (US); Purnima M. Rao, Seattle, WA (US); Rebecca Haruyama, Bellevue, WA (US); Shih-Sang Carnaven Chiu, Seattle, WA (US); Stuart Mayhew, Seattle, WA (US); Oscar E. Murillo, Redmond, WA (US); Carlos Fernando Faria Costa, Yarrow Point, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 21 days.

(21) Appl. No.: 15/331,746

(22) Filed: Oct. 21, 2016

(65) Prior Publication Data
US 2017/0236332 A1 Aug. 17, 2017

Related U.S. Application Data

(60) Provisional application No. 62/296,027, filed on Feb. 16, 2016.

(51) Int. Cl.
*G09G 5/00* (2006.01)
*G06T 19/00* (2011.01)
*G02B 27/01* (2006.01)
*G06F 3/01* (2006.01)
*G06F 3/041* (2006.01)
(Continued)

(52) U.S. Cl.
CPC ........ *G06T 19/006* (2013.01); *G02B 27/0172* (2013.01); *G06F 1/163* (2013.01);
(Continued)

(58) Field of Classification Search
CPC .............. G06T 19/006; G02B 27/0172; G02B 2027/0138; G02B 2027/014;
(Continued)

(56) References Cited

U.S. PATENT DOCUMENTS 9,687,155 B2 * 6/2017 Aarabi ................. A61B 5/0077
9,779,553 B2 * 10/2017 Byrne ..................... G06T 17/00
(Continued)

FOREIGN PATENT DOCUMENTS

WO 2015116183 A2 8/2015

OTHER PUBLICATIONS

"ModiFace Mirror", YouTube Website, Available online at https://www.youtube.com/watch?v=ZAv2sunQKCc, Mar. 3, 2015, 1 page.
(Continued)

*Primary Examiner* — Robert Craddock
(74) *Attorney, Agent, or Firm* — Alleman Hall Creasman & Tuttle LLP

(57) ABSTRACT

A mixed-reality display device comprises an input system, a display, and a graphics processor. The input system is configured to receive a parameter value, the parameter value being one of a plurality of values of a predetermined range receivable by the input system. The display is configured to display virtual image content that adds an augmentation to a real-world environment viewed by a user of the mixed-reality display device. The graphics processor is coupled operatively to the input system and to the display; it is configured to render the virtual image content so as to variably change the augmentation, to variably change a perceived realism of the real world environment in correlation to the parameter value.

20 Claims, 8 Drawing Sheets

(51) Int. Cl.
*G06F 3/16* (2006.01)
*G06F 3/0488* (2013.01)
*G06F 1/16* (2006.01)
*G06F 3/03* (2006.01)
*G06F 3/0362* (2013.01)
*G06F 3/0484* (2013.01)

(52) U.S. Cl.
CPC .............. *G06F 3/012* (2013.01); *G06F 3/013* (2013.01); *G06F 3/016* (2013.01); *G06F 3/017* (2013.01); *G06F 3/0304* (2013.01); *G06F 3/0362* (2013.01); *G06F 3/041* (2013.01); *G06F 3/0488* (2013.01); *G06F 3/04842* (2013.01); *G06F 3/04847* (2013.01); *G06F 3/167* (2013.01); *G02B 2027/014* (2013.01); *G02B 2027/0138* (2013.01); *G02B 2027/0147* (2013.01); *G02B 2027/0178* (2013.01); *G06F 2203/0381* (2013.01)

(58) Field of Classification Search
CPC .... G02B 2027/0147; G02B 2027/0178; G06F 3/017; G06F 3/041; G06F 3/167; G06F 1/163; G06F 3/0488; G06F 3/013; G06F 3/016; G06F 3/0304

USPC ........................................................ 345/633
See application file for complete search history.

(56) References Cited

U.S. PATENT DOCUMENTS

| 2007/0216675 | A1* | 9/2007 | Sun ........................ G06T 11/00 345/419 |
| 2008/0307307 | A1* | 12/2008 | Ciudad ................... G06T 13/80 715/719 |
| 2013/0127980 | A1* | 5/2013 | Haddick ................ G06F 3/013 348/14.08 |
| 2016/0270656 | A1* | 9/2016 | Samec ................... A61B 3/085 |

OTHER PUBLICATIONS

ISA European Patent Office, International Search Report and Written Opinion Issued in PCT Application No. PCT/US2017/017278, dated Apr. 25, 2017, WIPO, 12 pages.

* cited by examiner

REALITY MIXER FOR MIXED REALITY

CROSS REFERENCE TO RELATED APPLICATION

This application claims priority to U.S. Provisional Patent Application Ser. No. 62/296,027, filed Feb. 16, 2016, the entirety of which is hereby incorporated herein by reference.

BACKGROUND

Some display devices offer a mixed-reality (MR) experience, in which real objects in a user's field of view are combined with computerized, virtual imagery. Such devices may superpose informative textual overlays on real-world scenery or augment the user's world view with virtual content, for example.

SUMMARY

One embodiment is directed to a mixed-reality display device comprising an input system, a display, and a graphics processor. The input system is configured to receive a parameter value, the parameter value being one of a plurality of values of a predetermined range receivable by the input system. The display is configured to display virtual image content that adds an augmentation to a real-world environment viewed by a user of the mixed-reality display device. The graphics processor is coupled operatively to the input system and to the display; it is configured to render the virtual image content so as to variably change the augmentation, to variably change a perceived realism of the real world environment in correlation to the parameter value.

This Summary is provided to introduce in a simplified form a selection of concepts that are further described in the Detailed Description below. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
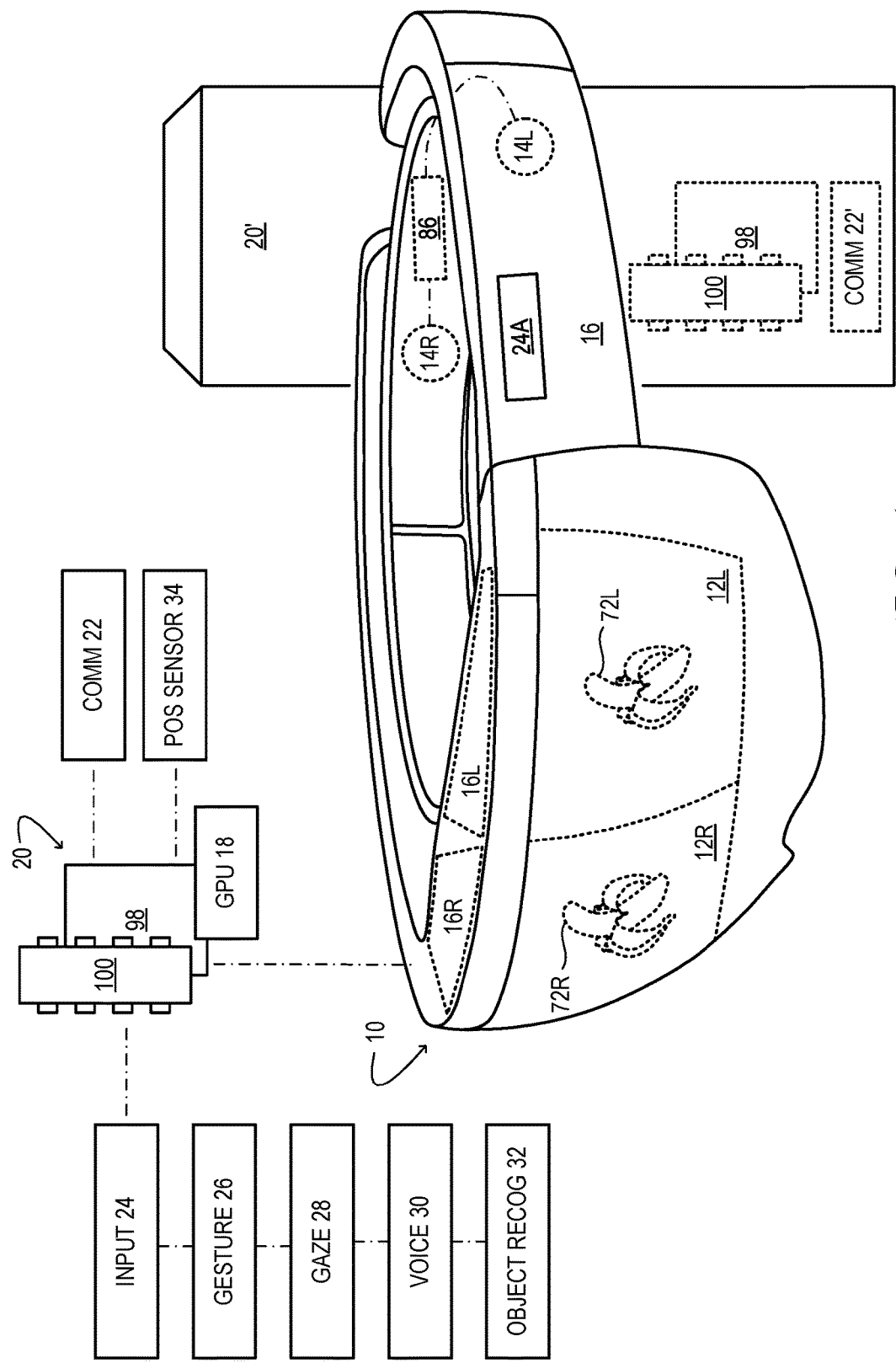
FIG. 1 shows aspects of an example near-eye display device and off-board computer.

This disclosure is directed to methods and configurations for manipulating presentation properties of objects sighted in a mixed-reality (MR) environment. In this description, an 'MR environment' is one in which real-world imagery is visual y augmented by, or otherwise modified by, one or more virtual-reality (VR) objects or components. The modified MR imagery is provided to the user via a headset or other display device. In addition to visual imagery, MR also embraces the mixing of other presentation properties, such as audio and haptic properties. Accordingly, virtual audio and haptic content may be added to, subtracted from, or otherwise used to transform the sounds and/or feeling of the real world, which is then passed on to the user in modified form. For example, a suitably configured display device may add a video overlay (e.g., a virtual hat) to an object or person sighted in a real video feed. Sound and/or feeling may also be added to the object or person. Some MR environments provide persistent, rational positioning of virtual objects and imagery relative to the real world. For instance, a virtual floral arrangement placed on a real table may continue to be rendered as placed across multiple MR sessions.

In one embodiment, the hardware used to deliver the composite MR experience to the user may include a VR headset with a world-facing vision system and microphone to capture real imagery and audio. The imagery ultimately provided to the user is a composite that combines the real-world video feed and one or more synthetic video overlays. Less immersive MR experiences may be achieved with other display devices having, for example, a world-facing vision system. In some examples, the display and vision system may be installed in an environment, such as a home, office, or vehicle. So-called 'augmented-reality' (AR) headsets, in which at least a portion of the outside world is directly viewable through the headset, may also be used.

At the heart of the disclosed approach is the understanding that virtualized aspects of user-sighted imagery (real or virtual) may be parameterized in various ways. In particular, each object in an MR experience may have an independent set of parameters associated with it. Some parameters may control the virtual aesthetic of the object: shape, size, texture, opacity, blur, or manner of presentation—e.g., from the realistic to the fantastic. Other parameters may control the behavior of a virtual object: mass and associated kinematics, physical strength or jumping ability for people, and vocal properties such as loudness and pitch, for example. Still other parameters control the temporal evolution of a virtual object: is the object to be represented as it would look now, or as it would have looked at some time in the past, or as it may look at some point in the future? Because such properties may be individually parameterized for different objects in an MR experience, the experience as a whole may be altered or adjusted by independently changing the associated parameter values of one or more objects.

The primary mechanism for changing parameter values governing object properties is the MR mixer aspect of this disclosure. The MR mixer provides a mechanism for adjusting various presentation properties of objects, through underlying parameter values associated with the objects. Object parameter values may be varied individually or collectively. In this way, the user can adjust the mixture of reality and fantasy in an MR experience in a manner analogous to the mixing of different audio tracks in a recording studio.

The user may access the MR mixer herein via any suitable user-interface (UI) modality. In one embodiment, a world-facing vision system includes both depth- and flat-imaging cameras. The vision system may be used to construct, in real time, world surfaces of the objects in the user's field of view (FOV). An object-recognition engine downstream of the vision system identifies the various real-world objects, making those objects available for selection. In one example, the user directs his or her gaze at an object whose presentation properties are to be adjusted. With a finger tap on the frame of the MR headset, the user initiates selection of the gazed-at object. The user then utters an audible command 'MR mixer,' which brings up the MR mixer UI control for the selected object. In some instances, the selected object may be recognized prior to display of the MR mixer UI control. Accordingly, the control may offer intelligently the ability to adjust only those properties belonging to a selected object.

As noted above, the disclosed MR mixer may invoke a method for recognizing real-world objects that can be incorporated and manipulated within an MR experience. Object recognition may be used to identify people, objects and environments that can be adjusted, and to what level. Object recognition may take advantage of conspicuous paint or tags, specific patterns, materials, forms, etc. Real-world clothing, for example, may come bundled with an array of virtual instantiations. Real-world shoes, gloves, hats, rings, or any accessory, may be associated with extraordinary properties in the virtual world—e.g., the ability to grow vegetation, set things on fire, draw portals from world to world, or enable flight. Real-world internet-of-things (IoT) hardware—audio loudspeakers, lamps, appliances, controllers such as thermostats, etc.—may take on much more augmented forms in the virtual space.

The MR mixer concept goes well beyond the simple idea of video, audio, and haptic mixing. It extends to dynamic adjustment of complex aesthetic and behavioral parameters of real and virtual objects within an MR environment. Complex aesthetic and behavioral parameters may include, for example, time and place. In one example, the time of day over a selected space may be altered by providing simulated lighting and weather, as well as potential modification of structures and landscape. Further, the immersive nature of an audio experience may be altered, being able to tune in and out particular sounds—e.g., the sound of an entire experience versus just one audio element, such as the wind. Another example is to mix in audio from a different application (e.g., a network audio source) as a sound track of sorts to a selected MR space. Assuming that virtual components—avatars of people, virtual objects, etc.—are built in a progressive way (viz., 3D modeling, texturing, and lighting), the MR mixer may provide the user with the ability to view the construction process as a time-lapse. This aspect becomes clearer when visualizing changes made in a public MR space by multiple users, who then may experience the evolution of the space. In one particular example, the user may image a map-like view of all know digital spaces that one has access to, which data about traveled terrain can be overlaid upon. In this manner, the user can not only understand and recall past experiences, but also explore unseen and available worlds. The 'time' component of the mixer applies also to this example.

The MR mixer concept disclosed herein also enables targeting and adjusting aesthetic and behavioral parameters of real and virtual objects that are in motion within an MR environment. This ability leverages a core interaction model for morphing objects that are in motion, or, when the user is in motion (e.g., in a car) whilst targeting an object. For example, the user may target and alter one bird from a flock of birds mid-flight. Once changes are applied, the entire flock inherits the new property. In other examples, the user may change the color, viscosity, virtualized mass, or speed of moving liquid in real-time.

In some embodiments, the MR mixer may automatically adjust aesthetic and behavioral parameters of real and virtual objects based on explicit or implicit user signal. For example, certain objects may be brought in to focus (visually, sonically, haptically) based on the user's perceived intent. The user, for instance, may stare across a room at a group of people chatting. Pursuant to this cue, the mixer may allow the curious user to peek into closed or distant rooms or 'worlds' to gain a preview of the people's experience prior to joining it. The worlds explored may be filtered based on the interests of the user. For instance, a social network application leveraging a social graph may be overlaid over an entire virtual world, in order to enable the user to see only those people that are in the user's social graph, or share one or more properties. Similarly, a virtual world may be filtered by a photo-sharing application, based on an image; the MR mixer may be configured to select from the world more content 'like' that image.

In some embodiments, the MR mixer may be configured to automatically modify relational aspects between real and virtual objects based on dynamic adjustments of aesthetic and behavioral parameters. In this manner, the mixer may reconcile the collision of two or more experiences that include elements of artificial intelligence (AI) or even crude self-navigation elements. For instance, the MR mixer may enable a character from one video game to interface with a character from another.

Aspects of this disclosure will now be described by example and with reference to the illustrated embodiments listed above. Components, process steps, and other elements that may be substantially the same in one or more embodiments are identified coordinately and described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 shows aspects of a near-eye display device 10 in one example embodiment. Near-eye display device 10 is a binocular, near-eye display device with see-thru display windows 12R and 12L, over-the-ear loudspeakers 14R and 14L, and a frame 16 configured to rest on the user's head. In other embodiments, the right and left display windows may be fully opaque, for a fully immersive display experience. In some embodiments, the opacity of display windows 12 is controllable dynamically via a dimming filter. A substantially see-through display window, for example, may be switched to full opacity for a fully immersive MR experience.

Near-eye display device 10 includes right microdisplay 16R and left microdisplay 16L. The right and left microdisplays are configured to project computerized virtual display imagery onto right and left display windows 12R and 12L, respectively. The microdisplays are driven by a graphics processor 18 of on-board computer 20. The on-board computer may be operatively coupled to various active and sensory components of the near-eye display device, including communication system 22. In some embodiments, the graphics processor is configured to render the virtual display imagery projected onto the display windows. In some embodiments, such rendering is controlled, in whole or in part, by data received through the on-board communication system. In some embodiments, such data may be transmitted by an off-board computer 20'. The off-board computer may be a game console, desktop computer, or networked server system, for example. In other embodiments, the off-board computer may be a laptop or tablet computer, smartphone, hand-held gaming device, etc. Display imagery or data controlling the rendering of display imagery may be communicated in any manner from off-board computer 20' to on-board computer 20. Signal encoding such data may be carried over a wired or wireless communication link between the communication systems 22 of the respective computers.

When near-eye display device 10 is in operation, the user of the display device views the right and left display images through his right and left eyes, respectively. When the right and left display images are composed and presented in an appropriate manner, the user experiences an illusion of one or more virtual objects at specified positions, and having specified 3D content and other display properties. Such virtual imagery may have any desired complexity; it may, for example, comprise a complete virtual scene having both foreground and background portions.

Near-eye display device 10 of FIG. 1 includes an input system 24 configured to receive a parameter value. The parameter value may be received from a user of the near-eye display device, or from off-board computer 20'. The parameter value received may be one of a plurality of values of a predetermined (in some cases numeric) range receivable by the input system. Example ranges include negative five to positive five, zero to two-hundred fifty-six, zero to one-hundred percent, etc. In some embodiments, the parameter value may be one of three or more available values within the predetermined range. The range of values may be discrete (with available parameter values separated by a large increment relative to the size of the range) or quasi-continuous (with available parameter values separated by a small increment relative to the size of the range).

Input system 24 may differ in the different embodiments of this disclosure. In some embodiments, the input system may include a mechanical dial on near-eye display device 10, or on a smartphone, game controller, or other device. The user may increase the parameter value by rotating the dial clockwise, or decrease the parameter value by rotating the dial counterclockwise, for instance.

In some embodiments, user selection of the parameter value is facilitated via one or more UI elements presented on near-eye display device 10, or on another display device. The one or more UI elements may be displayed by microdisplays 16 in the embodiment of FIG. 1, or presented by any other UI component of a device. In some scenarios, the UI control may appear only after the user has invoked the MR mixer and may disappear after the MR mixing operation is finished.

In some embodiments, input system 24 may include a touch sensor 24A disposed on frame 16 of near-eye display device 10, or elsewhere. The user may slide or tap a finger on the touch sensor to effect input of the variable parameter value. In some examples, the touch sensor may emulate a touch-based virtual dial instantiated pursuant to application context. The user may increase the parameter value by tracing a clockwise path on the touch sensor, or decrease the parameter value by tracing counterclockwise path.

In some embodiments, input system 24 may include a camera coupled operatively to downstream gesture-recognition componentry 26. A world-facing depth-imaging camera, for example, may be configured to acquire a depth image of the environment in front of the user. A series of time-resolved depth images that reveal the user's hand gestures may be fed to the gesture-recognition componentry, which then may compute the parameter value. Alternatively, or in addition, the input system may include a gaze-tracking camera that faces the user. The gaze-tracking camera may be coupled operatively to downstream gaze-tracking engine 28. In some embodiments, gesture and/or gaze detection is used in conjunction with one or more UI elements displayed on near-eye display device 10. Parameter input may require the user to target one UI element to increase a given parameter value, or another UI element to decrease the parameter value. Alternatively, the user may say the words 'increase' or 'decrease' to effect a corresponding change in the parameter value. To this end, input system 24 may include a microphone coupled operatively to downstream voice-recognition componentry 30. In some embodiments, the variable parameter value may be received via direct audible input from the user.

An input system 24 in the form of a world-facing depth-imaging camera may be configured to image any or all aspects of the user's environment, including one or more real objects. Depth images from the world-facing depth-imaging camera may be provided to graphics processor 18, for the purpose of reconstructing the environment virtually. The term 'camera' refers herein to any machine-vision component having at least one optical aperture and sensor array configured to image a scene or subject. A depth-imaging camera may be configured to acquire a time-resolved sequence of depth maps of a scene or subject. As used herein, the term 'depth map' refers to an array of pixels registered to corresponding regions ($X_i$, $Y_i$) of an imaged scene, with a depth value indicating, for each pixel, the depth of the corresponding region. 'Depth' is defined as a coordinate parallel to the optical axis of the camera, which increases with increasing distance from the camera. Operationally, a depth-imaging camera may be configured to acquire 2D image data, from which a depth map is obtained via downstream processing. The term 'depth video' refers herein to a time-resolved sequence of depth maps.

The configuration of a depth-imaging camera may differ from one embodiment to the next. In one example, brightness or color data from two, stereoscopically oriented imaging arrays in a depth-imaging camera may be co-registered and used to construct a depth map. More generally, depth coordinates may be obtained using one or more flat-imaging cameras, with optical-tomography based co-registration of imaged features. Hyperspectral flat imaging may be used with this approach, for improved feature discrimination. In other examples, an illumination source associated with the depth-imaging camera may be configured to project onto the subject a structured illumination pattern comprising numerous discrete features—e.g., lines or dots. An imaging array in the depth-imaging camera may be configured to image the structured illumination reflected back from the subject. Based on the spacings between adjacent features in the various regions of the imaged subject, a depth map of the subject may be constructed. In still other examples, the illumination source may project a pulsed or otherwise modulated infrared (IR) or near IR illumination towards the subject. The sensor elements of the imaging array may be addressed so as to resolve a phase offset from each sensor element relative to the modulation of the illumination source. The phase offset, optionally converted to the depth domain, may be associated with the portion of the image corresponding to the sensor element addressed. In some embodiments, a series of IR acquisitions in rapid succession may be used to obtain the phase offset. In other embodiments, a pair of imaging arrays in the depth-imaging camera may be configured to detect the pulsed illumination reflected back from the subject. Both arrays may include an electronic shutter synchronized to the pulsed illumination, but the integration times for the arrays may differ, such that a pixel-resolved time-of-flight (ToF) of the pulsed illumination, from the illumination source to the subject and then to the arrays, is discernible based on the relative amounts of light received in corresponding elements of the two arrays.

In some embodiments, discrete flat-imaging and depth-imaging cameras may be arranged with parallel optical axes oriented in the same direction. In some embodiments, image or video output from the flat-imaging and depth-imaging cameras may be co-registered and combined into a unitary (e.g., RGB+depth) data structure or stream. In examples in which a depth-imaging camera is a suitably configured ToF depth-imaging camera, a data stream representing both depth and brightness (e.g., IR+depth) may be available by combining outputs differing in phase.

Continuing in FIG. 1, in some embodiments, input system 24 may be further configured to enable, with gesture recognition, selection of an object from among a plurality of objects sighted by the user. Further, the input system may be configured to apply object recognition to the selected object, so as to recognize what kind of object it is. Using object-recognition algorithms, an object-recognition engine 32 may be configured to compare objects resolved by the input system to a plurality of objects stored in a database or defined heuristically, and to identify a match. For some objects and scenarios, the object-recognition engine may identify a generic match (this object is a person). For other objects and scenarios, the object-recognition engine may identify a specific match (this object is my mother).

In the embodiment of FIG. 1, near-eye display device 10 includes a position sensor 34 configured to sense a position and orientation of the near-eye display device relative to an object in the environment, or to some other locus of reference. The position sensor may include an inertial measurement unit (IMU) including one or more accelerometers, gyroscopes, and magnetometers, and/or a global positioning system (GPS) receiver. In some embodiments, the position sensor returns a six degrees-of-freedom (6DOF) estimate of the three Cartesian coordinates of the near-eye display device, plus a rotation about each of the three Cartesian axes. The output of the position sensor may be used to map the position, size, and orientation of virtual display objects (defined globally) onto the right and left display windows 12 of the near-eye display device.

Figure 2:
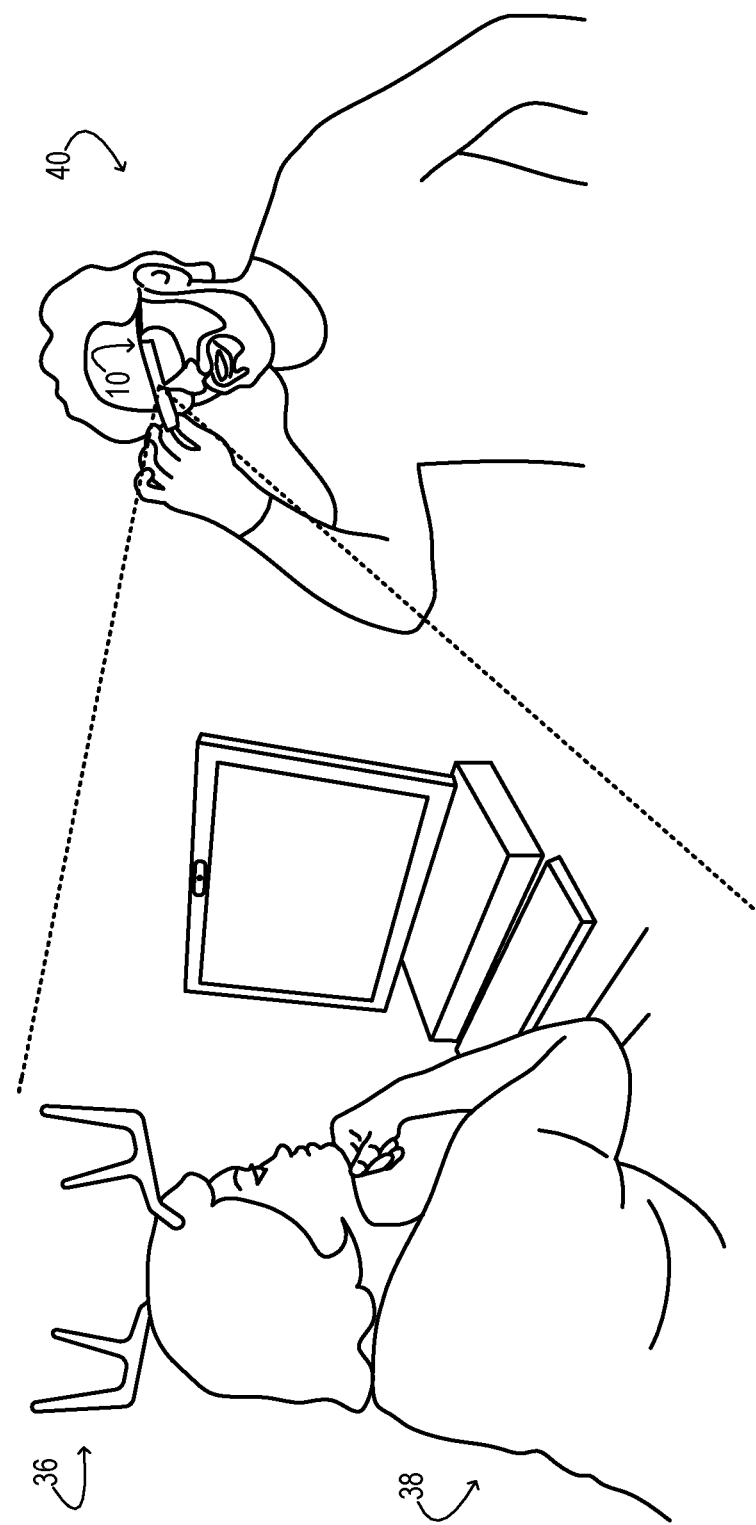
FIG. 2 shows a near-eye display device user sighting a foreground object augmented by virtual image content.

Turning now to FIG. 2, each microdisplay 16 of near-eye display device 10 may be configured to project virtual image content 36 at a predetermined location of an object 38 sightable by the user 40, or along the line of sight of that object. The virtual image content may be configured to add an augmentation to the real-world environment viewed by the user of the near-eye display device. In see-thru display embodiments, the virtual image content may serve to augment the real image of the object sighted through display windows 12. In embodiments in which the near-eye display device is fully immersive, the virtual image content may form the entire image of the object, together with any augmentation of the object that may be desired.

To these ends, graphics processor 18 of near-eye display device 10 may be configured to render the virtual image content so as to variably change the augmentation in a manner that variably change a perceived realism of the real-world environment. In other words, the virtual image content may impart a variable unrealistic quality to one or more objects sighted via the near-eye display device. In see-thru embodiments, where various real objects in the user's environment are sighted through transparent display windows 12, each microdisplay may be configured to superpose this virtual image content on the object, so as to impart the variable unrealistic quality. In fully immersive embodiments, where the input system includes a world-facing camera configured to acquire a primary image of the real environment, the primary image may be provided to the graphics processor, which then registers the virtual image content to corresponding real objects. Here, each microdisplay 16 is configured to project the secondary image of the object in its entirety, such that the secondary image together with the virtual image content is sightable by the user. Because graphics processor 18 is coupled operatively to input system 24, the variable unrealistic quality, in each of the above embodiments, can be made to vary in relation to the parameter value received via the input system.

Figure 3:
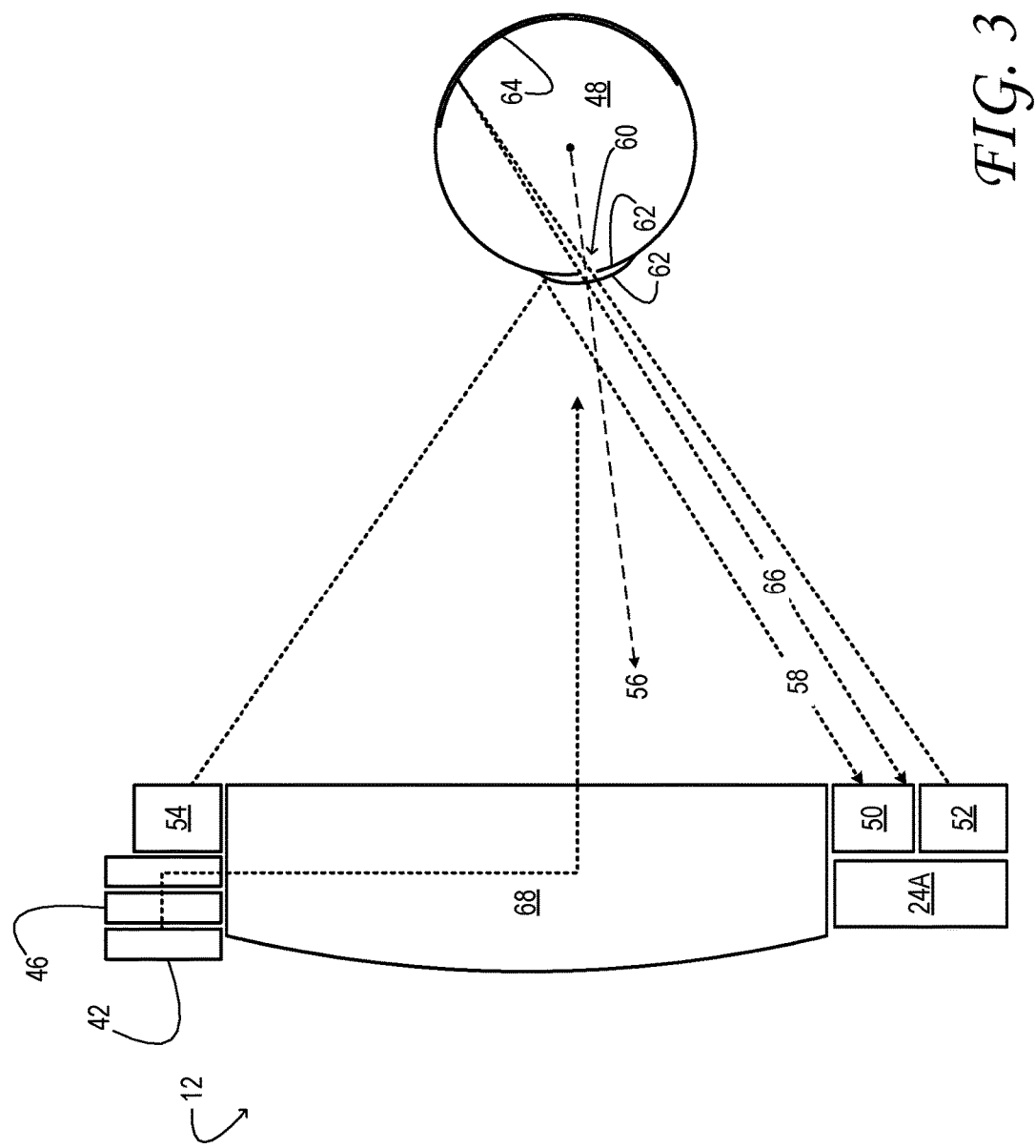
FIG. 3 shows aspects of an example display window of a near-eye display device.

FIG. 3 shows aspects of right or left display window 12 in one, non-limiting embodiment. The display window includes a backlight 42 and a liquid-crystal display (LCD) matrix 46. The backlight may include an ensemble of light-emitting diodes (LEDs)—e.g., white LEDs or a distribution of red, green, and blue LEDs. The backlight may be situated to direct its emission through the LCD matrix, which forms a display image based on control signals from graphics processor 18. The LCD matrix may include numerous, individually addressable pixels arranged on a rectangular grid or other geometry. In some embodiments, pixels transmitting red light may be juxtaposed in the matrix to pixels transmitting green and blue light, so that the LCD matrix forms a color image. The LCD matrix may be a liquid-crystal-on-silicon (LCOS) matrix in one embodiment. In other embodiments, a digital micromirror array may be used in lieu of the LCD matrix, or an active LED matrix may be used instead. In still other embodiments, scanned-beam technology may be used to form the right and left display images.

Continuing in FIG. 3, display window 12 also includes gaze-tracking engine configured to sense a pupil position of the right or left eye 48 of the user of near-eye display device 10. In the embodiment of FIG. 3, the gaze-tracking engine takes the form of a user-facing imaging system where eye-imaging camera 50 is arranged to image the user's eye. In the embodiment of FIG. 3, each display window 12 includes an on-axis illumination source 52 and an off-axis illumination source 54. Each illumination source emits infrared (IR) or near-infrared (NIR) illumination in a high-sensitivity wavelength band of the eye-imaging camera. Gaze-tracking engine 28 of on-board computer 20 is configured to use the output from the eye-imaging camera to track the gaze axis 56 of the user.

On- and off-axis illumination serve different purposes with respect to gaze tracking. As shown in FIG. 3, off-axis illumination can create a specular glint 58 that reflects from the cornea 62 of the user's eye. Off-axis illumination may also be used to illuminate the eye for a 'dark pupil' effect, where pupil 60 appears darker than the surrounding iris 62. By contrast, on-axis illumination from an IR or NIR source may be used to create a 'bright pupil' effect, where the pupil appears brighter than the surrounding iris. More specifically, IR or NIR illumination from on-axis illumination source 52 illuminates the retroreflective tissue of the retina 64 of the eye, which reflects the light back through the pupil, forming a bright image 66.

As noted above, image data from eye-imaging camera 50 is conveyed to gaze-tracking engine 28 of on-board computer 20. There, the image data may be processed to resolve such features as the pupil center, pupil outline, and/or one or more specular glints from the cornea. The locations of such features in the image data may be used as input parameters in a model—e.g., a polynomial model—that relates feature position to the gaze axis 56. The gaze vector can be used to target objects in the user's FOV, to actuate a gazed-based UI control, etc. In embodiments in which the gaze axis is determined for the right and left eyes, the gaze-tracking engine may also be configured to compute the user's focal point as the intersection of the right and left gaze axes.

In most cases, the display image from LCD matrix 46 is not suitable for direct viewing by the user of display device 10. In particular, the display image may be offset from the user's eye, may have an undesirable vergence, and/or a very small exit pupil. By passing the display image through a horizontal and vertical pupil expander 68, the display image is presented over an area that substantially covers the eye. This enables the user to see the display image over a suitable range of horizontal and vertical offsets between the microdisplay and the eye. FIG. 3 also shows an example placement of input system 24B, in the form of a world-facing depth-imaging camera (vide supra).

Figure 4:
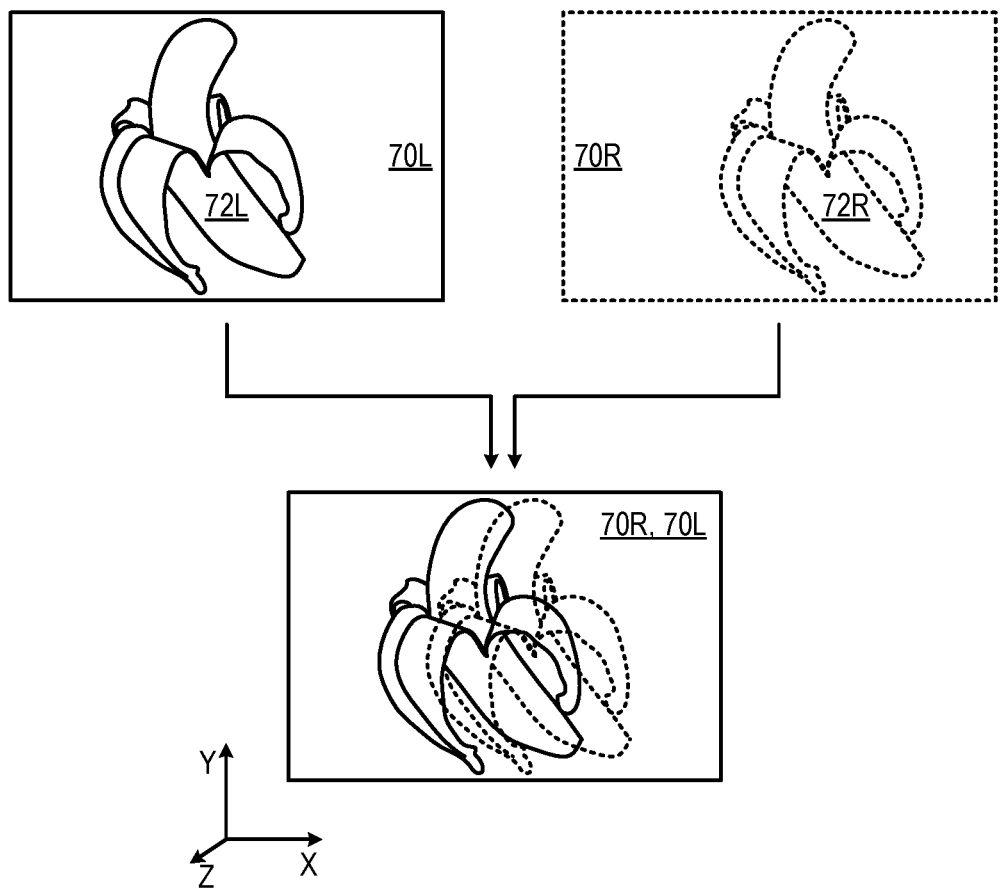
FIGS. 4 and 5 illustrate aspects pertaining to stereoscopic display of virtual image content.
Figure 5:
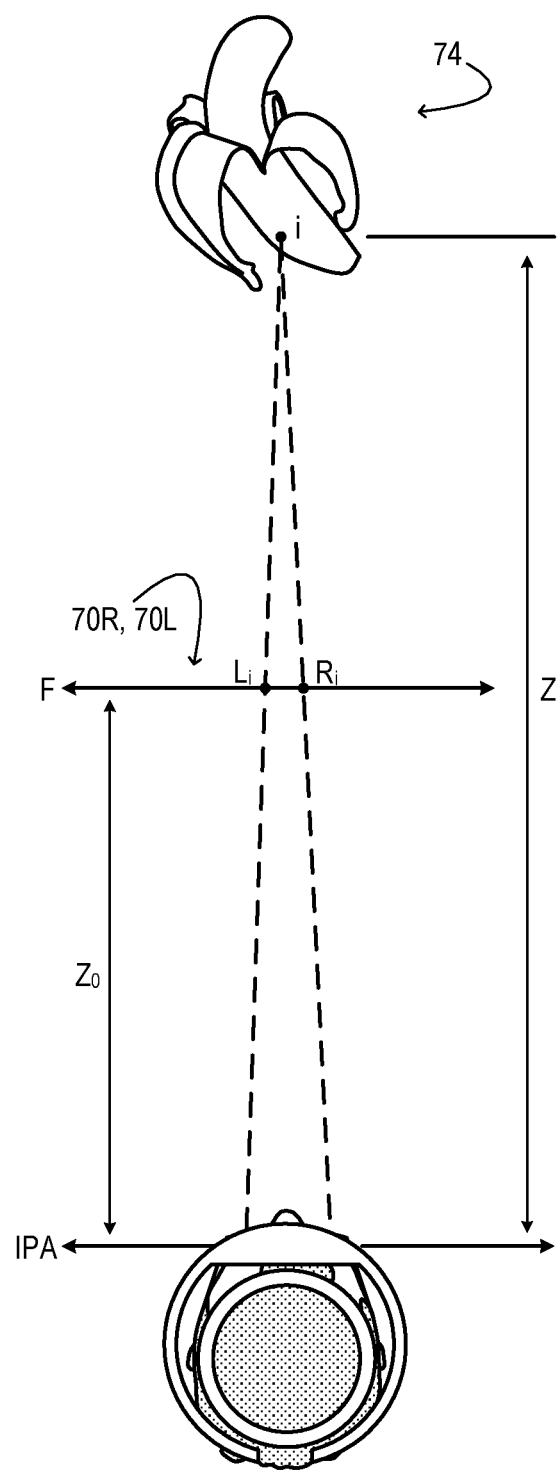

The user's perception of distance to virtual display imagery is affected by the positional disparity between the right and left display images. This principle is illustrated by way of example in FIG. 4. FIG. 4 shows right and left image frames 70R and 70L, overlaid upon each other for purposes of illustration. The right and left image frames correspond to the image-forming areas of LCD matrix 46 of the right and left display windows, respectively. As such, the right image frame encloses right display image 72R, and the left image frame encloses left display image 72L. Rendered appropriately, the right and left display images may appear to the user as virtual imagery. In the example of FIG. 4, the virtual imagery presents a surface of individually renderable loci viewable to the user. With reference now to FIG. 5, each locus i of the viewable surface has a depth coordinate $Z_i$ associated with each pixel $(X_i, Y_i)$ of the right and left display images. The desired depth coordinate may be simulated in the following manner.

At the outset, a distance $Z_0$ to a focal plane F of near-eye display device 10 is chosen. The left and right microdisplays are then configured to present their respective display images at the vergence appropriate for the chosen distance. In one embodiment, $Z_0$ may be set to 'infinity', so that each microdisplay 16 presents a display image in the form of collimated light rays. In another embodiment, $Z_0$ may be set to two meters, requiring each microdisplay to present the display image in the form of diverging light. In some embodiments, $Z_0$ may be chosen at design time and remain unchanged for all virtual imagery presented by the display device. In other embodiments, the microdisplays may be configured with electronically adjustable optical power, to allow $Z_0$ to vary dynamically according to the range of distances over which the virtual imagery is to be presented.

Once the distance $Z_0$ to the focal plane has been established, the depth coordinate Z for every locus i on the viewable surface may be set. This is done by adjusting the positional disparity of the two pixels corresponding to locus i in the right and left display images, relative to their respective image frames. In FIG. 5, the pixel corresponding to locus i in the right image frame is denoted $R_i$, and the corresponding pixel of the left image frame is denoted $L_i$. In FIG. 5, the positional disparity is positive—i.e., R is to the right of $L_i$ in the overlaid image frames. This causes locus i to appear behind focal plane F. If the positional disparity were negative, the locus would appear in front of the focal plane. Finally, if the right and left display images were superposed (no disparity, $R_i$ and $L_i$ coincident) then the locus would appear to lie directly on the focal plane. Without tying this disclosure to any particular theory, the positional disparity may be related to Z, $Z_0$, and to the interpupilary distance (IPD) of the user by $$D = IPD \times \left(1 - \frac{Z_0}{Z}\right).$$

In the approach described above, the positional disparity sought to be introduced between corresponding pixels of the right and left display images is 'horizontal disparity'—viz., disparity parallel to the interpupilary axis of the user of display device 10. Horizontal disparity mimics the effect of real-object depth on the human visual system, where images of a real object received in the right and left eyes are naturally offset along the interpupilary axis.

Virtual imagery of any desired complexity may be rendered in this manner. In one embodiment, logic in on-board computer 20 or off-board computer 20' maintains a model of the Cartesian space in front of the user in a frame of reference fixed to near-eye display device 10. The user's pupil positions are mapped onto this space, as are the image frames 44R and 44L, positioned at the predetermined depth $Z_0$. Then, virtual imagery 74 is constructed, with each locus i of a viewable surface of the imagery having coordinates $X_i$, $Y_i$, and $Z_i$, in the common frame of reference. For each locus of the viewable surface, two line segments are constructed a first line segment to the pupil position of the user's right eye and a second line segment to the pupil position of the user's left eye. The pixel $R_i$ of the right display image, which corresponds to locus i, is taken to be the intersection of the first line segment in right image frame 44R. Likewise, the pixel $L_i$ of the left display image is taken to be the intersection of the second line segment in left image frame 44L. This procedure automatically provides the appropriate amount of shifting and scaling to correctly render the viewable surface, placing every locus i at the required distance from the user.

No aspect of the foregoing description or drawings should be interpreted in a limiting sense, for numerous variants lie within the spirit and scope of this disclosure. For instance, although FIG. 1 shows a near-eye display device 10, in which the right display image appears behind a right display window, and the left display image appears behind a left display window, the right and left display images may also be formed on the same window. In a stereo display device for a laptop computer or home-theatre system, for example, the right display image may be formed on a display screen using light of one polarization state, and the left display image may be formed on the same display screen using light of a different polarization state. Orthogonally aligned polarization filters in the user's eyewear may be used to ensure that the appropriate display image is received in the appropriate eye.

Figure 6:
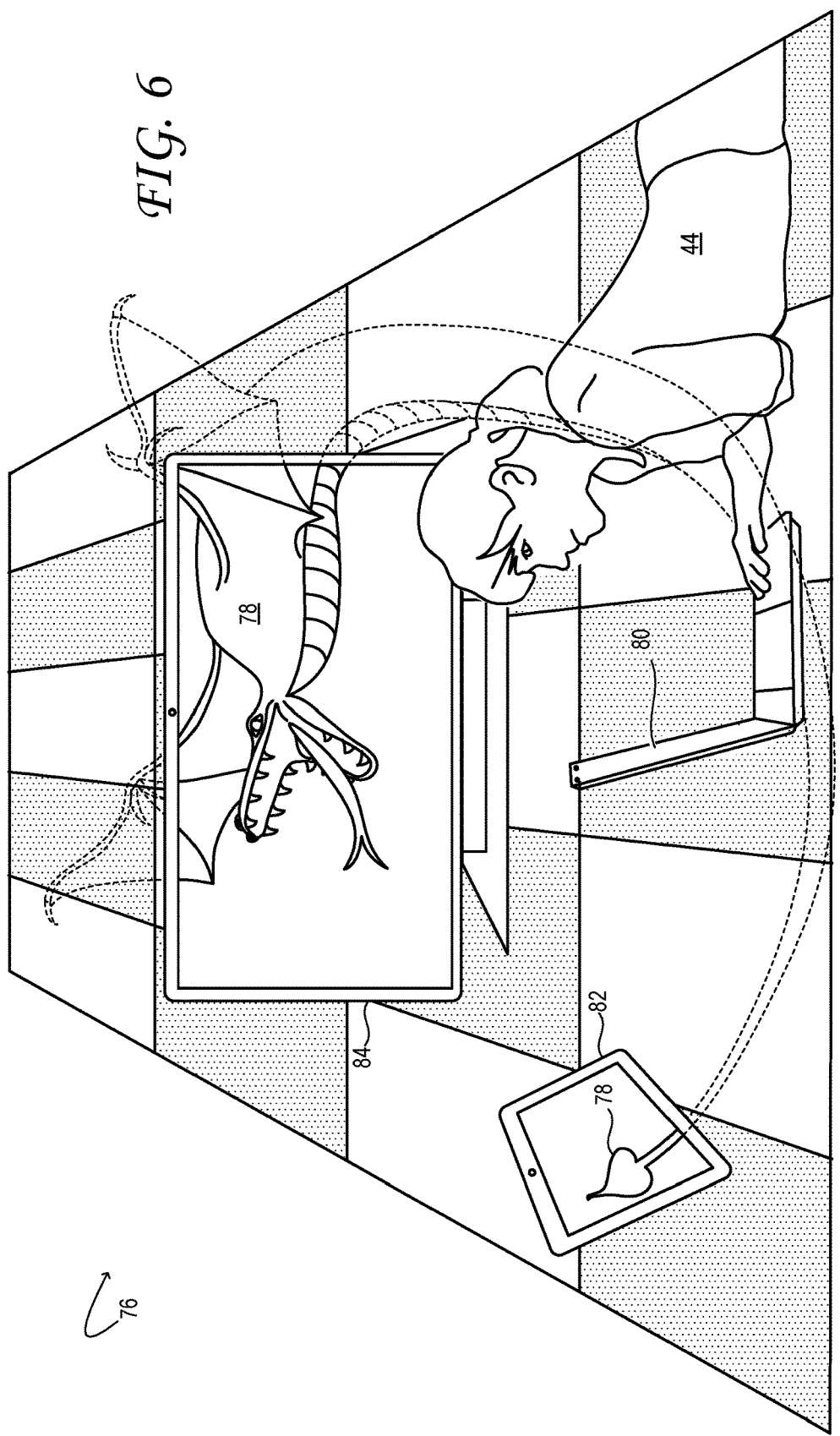
FIG. 6 shows various non-near-eye display devices engaged in mixed-reality (MR) presentation.

Convincing MR may be provided, in some examples, using non-see-through display devices otherwise similar to near-eye display device 10, or non-near-eye display devices as shown in FIG. 6. World-facing input systems may be embodied as rear-mounted cameras of a smartphones, tablets, and laptop computers. These input systems may provide real video feed from the approximate vantage point of the device user. The real video feed may then be combined with (or otherwise modified by) virtual display content, to generate a composite video feed. As noted above, position-sensing componentry of display-enabled devices may be used to facilitate the mapping of the virtual display content to local display coordinates. The composite video feed is then presented, in real time, on the display.

More particularly, FIG. 6 shows aspects of an example MR environment 76 having three different non-wearable display devices configured as described above. In FIG. 6 the environment is an interior living space in which a single user 40 is immersed in an MR experience. The imagery, in this case, includes a fantastic virtual-reality (VR) display image 78, which is viewable on each of the display devices. The devices shown in the drawing include a laptop computer 80, a tablet computer 82 and a television monitor 84. Each device may be enabled with a rear-mounted camera to capture the real imagery behind that device.

Returning briefly to FIG. 1, near-eye display device 10 includes an audio-mixing component 86 operatively coupled to loudspeakers 14R and 14L. The loudspeakers may be configured to emit audio seeming to originate at the predetermined location of an object to be augmented. For example, the audio from each speaker may become louder when that speaker approaches the location, or may not turn on at all until the object is approached to within a threshold distance. Coupled operatively to input system 24 and to the loudspeakers, the audio-mixing componentry may be configured to compose an audio overlay to impart a variable unrealistic quality to the real object. Again, the variable unrealistic quality may vary in relation to a parameter value.

A variety of different parameters may be selectively adjusted to affect the balance between realism and augmentation. In some embodiments, a variable unrealistic quality controlled by the MR mixer may include one or more of color, texture, lighting, shadow, opacity, blur, and pixelization of an object. In some embodiments, a variable unrealistic quality may include the manner of aesthetic presentation of an object. Here, the parameter value may range from real aesthetic presentation to fantastical aesthetic presentation.

Figure 7:
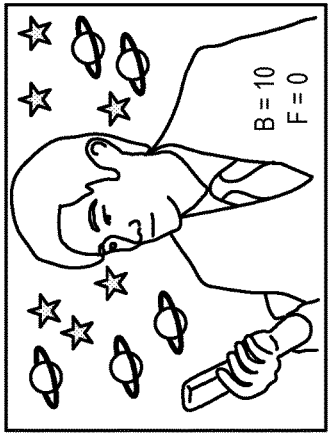
FIG. 7 illustrates the variation of two different fantasy parameters across a series of MR presentations.
Figure 7:
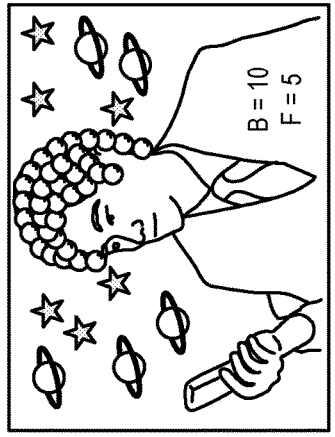
Figure 7:
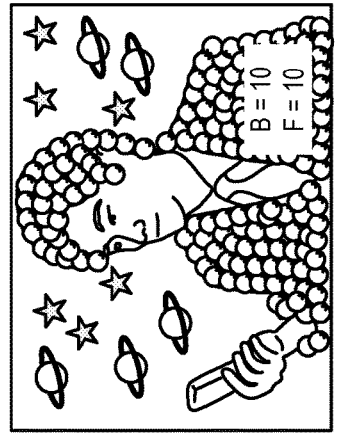
Figure 7:
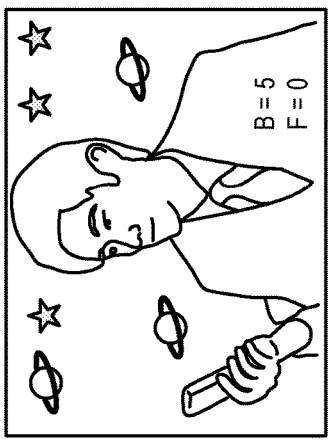
Figure 7:
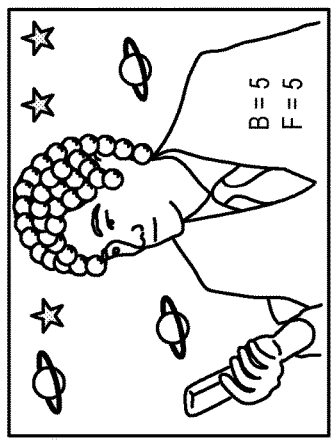
Figure 7:
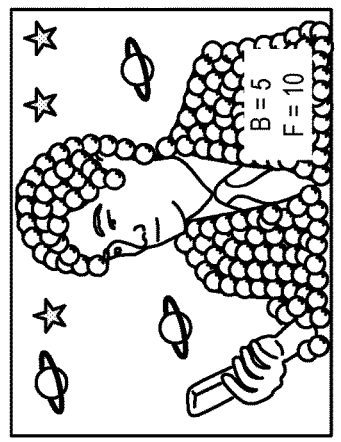
Figure 7:
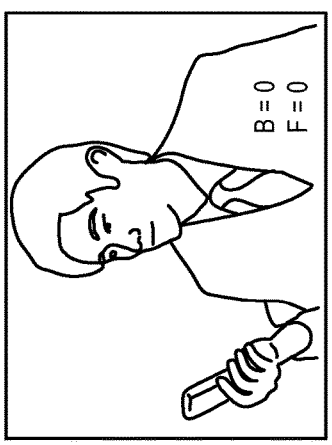
Figure 7:
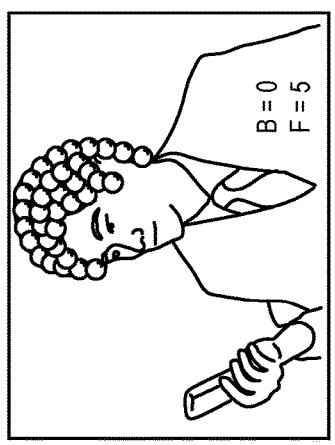
Figure 7:
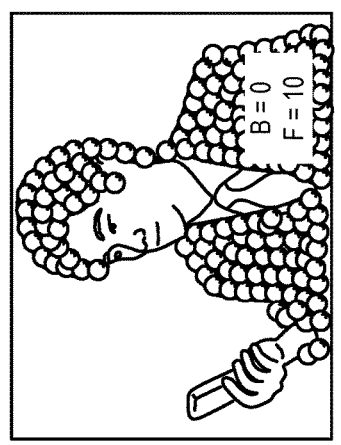

In the example of FIG. 7, two different fantasy parameter values are varied across a series of MR mixer presentations. Progressing left to right across the drawing, the value of background fantasy parameter B increases. Progressing down the drawing from top to bottom, the value of foreground fantasy parameter value F increases. As such, the top left view box shows a user's unaltered view of a real world environment including a man holding a cell phone; and the bottom right view shows a highly fantasized augmentation of the real world environment. In the example of FIG. 7, each fantasy parameter has eleven possible values, with zero representing the unaltered view and ten representing the fully fantastical view. As the foreground fantasy parameter F is adjusted up from zero toward ten, the person holding the cell phone is covered increasingly by blueberries. As the background fantasy parameter B is increased, the environment behind the person becomes increasingly embellished with stylized stars and planets.

In other embodiments, the variable unrealistic quality controlled by the MR mixer may include virtualized mass and associated kinematics of a foreground object. The augmentation may be configured, more specifically, to change the virtualized mass and associated kinematics of an object within the real-world environment responsive to a changing parameter value, which ranges from realistic virtualized mass to unrealistic virtualized mass. In some embodiments, the variable unrealistic quality may include temporal evolution of the appearance of a foreground or background object, where the parameter value ranges from a past time to a future time. The augmentation may be changed such that the appearance of the person holding the cell phone may show the effects of accelerated aging, for example, or revert to a more youthful state. In some embodiments, the variable unrealistic quality may include a relational aspect of a foreground or background object relative to one or more nearby objects. Thus, the augmentation may be configured to alter the relational aspect pursuant to changes in the parameter value. In embodiments including a loudspeaker and audio-mixing componentry, the variable virtual quality may include one or more of loudness and pitch emitted by the object.

These and other adjustments may be enacted via the hardware configurations described above, or by any other suitable hardware configuration using any suitable process. For devices that utilize world-facing cameras and an electronic display, the unaltered view (in the upper left of FIG. 7) may be achieved by displaying the image sighted by the world-facing camera without significant augmentation. While shown in the context of adjusting an image of a person positioned in front of a background, any sighted object or collection of objects may be adjusted in a similar manner. Moreover, adjustments to different kinds of parameters may be made together. Adjustments can be made collectively, for instance, to a fantasy parameter, a resolution parameter, and an opacity parameter.

A partial-opacity effect may be achieved by estimating the background behind a sighted foreground object and augmenting the view of the foreground object by overlying a partially transparent rendering of the estimated background. For full transparency, the MR mixer is used to effectively remove the foreground object from the scene. A full-transparency effect may be achieved by estimating the background behind the sighted foreground object and augmenting the view of the foreground object by overlying a fully-opaque rendering of the estimated background. When a see-through display is utilized, a fully-opaque rendering may be achieved by selectively blocking scene light from reaching the vies s eyes. Similarly, a reduced resolution effect may be achieved by identifying the foreground object in an image captured by world-facing cameras, and overlaying a pixelated image of just the foreground object in registration with the see-through view of the foreground object. For devices that utilize world-facing cameras and an electronic display, a reduced resolution effect may be achieved by identifying the foreground object in an image captured by the world-facing camera and pixelating a portion of the image corresponding to the identified foreground object.

Figure 8:
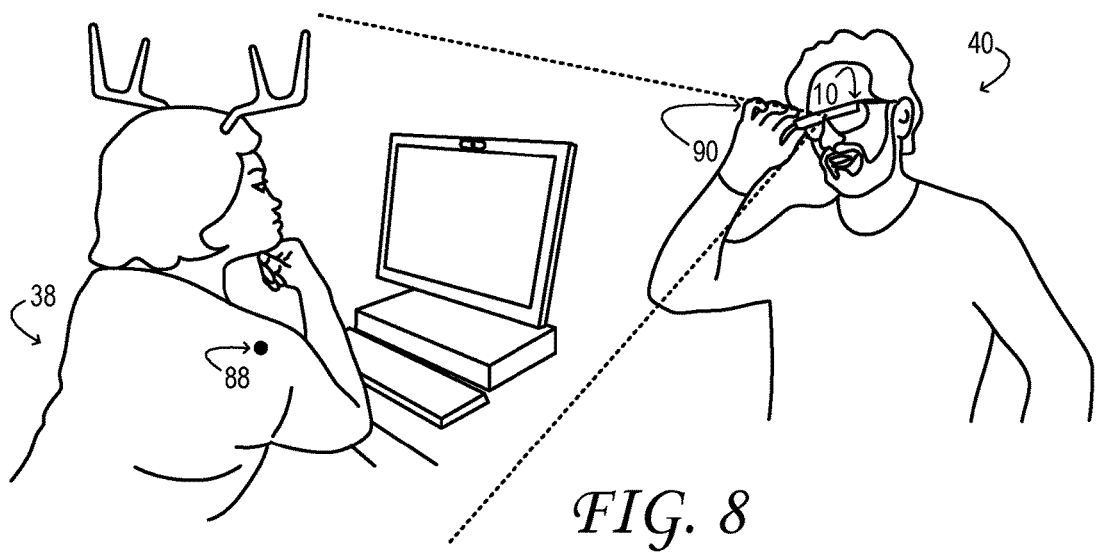
FIG. 8 illustrates selection of a foreground object to which MR mixing is applied.
Figure 9:
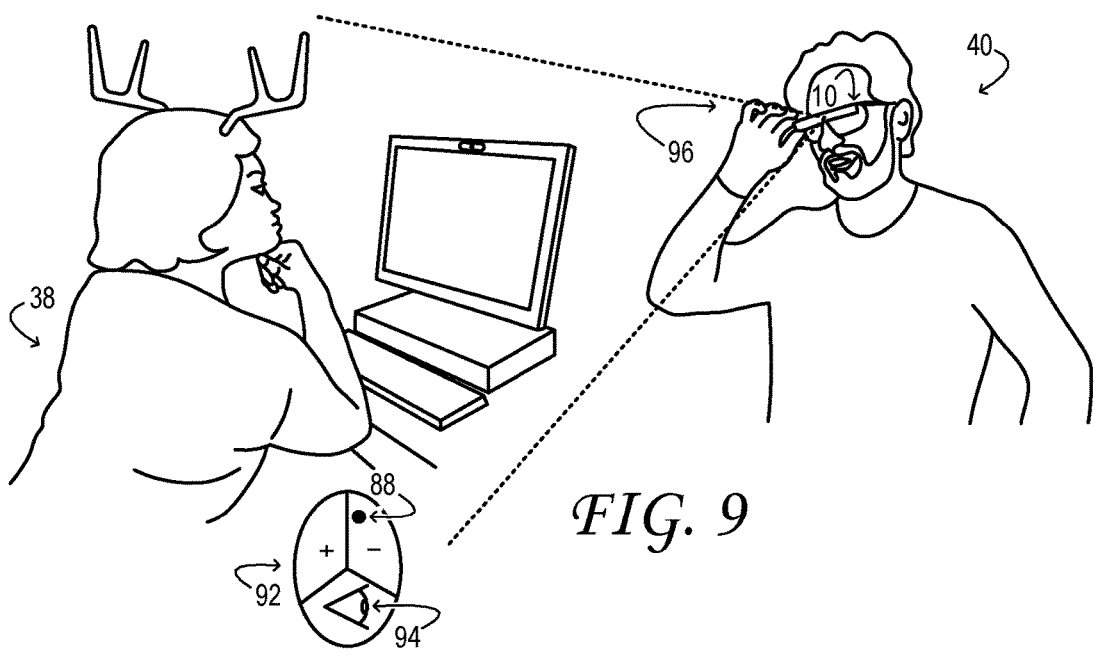
FIG. 9 illustrates parameter adjustment of a selected foreground object using an MR mixing.

FIGS. 8 and 9 show usage scenarios in which one or more parameters may be selectively adjusted to affect the balance between realism and augmentation. These and other adjustments may be made by any suitable hardware configuration, using any suitable process. FIG. 8 shows a sighted scene that includes a person 38. The drawing shows a black dot 88 on the person, which schematically represents a gaze target (or another type of selection target) of user 40. FIG. 8 also schematically shows a frame-tap gesture 90 performed by the user in order to select the sighted person. Depending on the hardware capabilities of the device used to sight the scene, a variety of different inputs (e.g., vision-recognized gesture, voice, device input (e.g., buttons), and peripheral device input (e.g., smartphone or game controller buttons)) may be used to select any foreground object. Any suitable processing approach may be used to differentiate the foreground object from everything else in the scene (e.g., foreground/background analysis using depth information, edge detection, and machine-learning recognizers).

FIG. 9 shows a parameter adjustment visual 92 overlaid on a scene. Parameter adjustment visuals optionally may be displayed by near-eye display device 10 coordinated with the selected foreground object (e.g., person 38 of FIG. 9) to provide the user an indication of which object is selected for adjustment. Parameter adjustment visuals may include icons, text, or other indicia that indicate what type of adjustment will be made. In the example of FIG. 9, the parameter adjustment visual includes an eyeball icon 94 to indicate that the opacity of the sighted object will be changed. The black dot 88 indicates that the user is gaze targeting the decrease icon of the parameter adjustment visual. Furthermore, FIG. 9 schematically shows a symbolic frame-slide gesture 96 performed by the user in order to decrease the opacity of the selected foreground object. In some embodiments, the user may execute a commit gesture, which is used to finalize the adjustment. In a more particular example, the user may gaze at the ceiling and speak a 'change ceiling' command, thus selecting the ceiling for adjustment. As introduced above, a ceiling or other object (foreground or background) may be recognized using any suitable process. For example, a depth image may be analyzed to find a generally horizontal overhead surface.

Other examples may include overlay of a theme selection visual overlaid on the scene sighted by the user. Such an overlay may allow a viewer to quickly change the appearance of an entire scene between any of several possible theme presets. Theme selection may effectively hide the real background from view and create the illusion of the user being in a completely different environment. A theme preset may allow the viewer to make several changes to a scene at once, as opposed to changing each individual aspect independently.

In some embodiments, a physics parameter or other behavior parameter may be selectively adjusted. In contrast to the appearance-based parameters described above, a behavior parameter may affect the way a sighted object interacts with other objects and/or forces. For example, if a gravity parameter is decreased in a room, a real bouncing ball in the room may be virtually erased and replaced with a virtual ball that bounces higher.

Some examples may include a dollhouse scene selection tool. A dollhouse selection tool allows the user to zoom in and/or out of a sighted scene. When this type of zoom is performed, the user may be visually presented a modeled representation of a world with a scale and perspective that is selectively changeable by the viewer (e.g., using gesture input, voice input, or mechanical input). In this way, the user is able to virtually sight the world at different scales and from different perspectives without actually moving throughout the world. The user may then make changes to the virtually sighted world, and such changes may be implemented when the viewer subsequently moves (physically or virtually) to sight the changed world.

As evident from the foregoing description, the methods and processes described herein may be tied to a computer system of one or more computers. Such methods and processes may be implemented as a computer-application program or service, an application-programming interface (API), a library, and/or other computer-program product.

Shown in FIG. 1 in simplified form is a non-limiting example of a computer system used to support the methods and processes described herein. Each computer 20 in the computer system includes a logic machine 98 and an instruction-storage machine 100. The computer system also includes a display in the form of microdisplays 16, a communication system 22, and various components not shown in FIG. 1.

Each logic machine 98 includes one or more physical devices configured to execute instructions. For example, a logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Each logic machine 98 may include one or more processors configured to execute software instructions. Additionally or alternatively, a logic machine may include one or more hardware or firmware logic machines configured to execute hardware or firmware instructions. Processors of a logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked computing devices configured in a cloud-computing configuration.

Each instruction-storage machine 100 includes one or more physical devices configured to hold instructions executable by an associated logic machine 98 to implement the methods and processes described herein. When such methods and processes are implemented, the state of the instruction-storage machine may be transformed—e.g., to hold different data. An instruction-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. An instruction-storage machine may include volatile, nonvolatile, dynamic, static, read/write, read-only, random-access, sequential-access, location-addressable, file-addressable, and/or content-addressable devices.

It will be appreciated that each instruction-storage machine 100 includes one or more physical devices. However, aspects of the instructions described herein alternatively may be propagated by a communication medium (e.g., an electromagnetic signal, an optical signal, etc.) that is not held by a physical device for a finite duration.

Aspects of the logic machine(s) and instruction-storage machine(s) may be integrated together into one or more hardware-logic components. Such hardware-logic components may include field-programmable gate arrays (FPGAs), program- and application-specific integrated circuits (PA-SIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of a computer system implemented to perform a particular function. In some cases, a module, program, or engine may be instantiated via a logic machine executing instructions held by an instruction-storage machine. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc.

The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some embodiments, a service may run on one or more server-computing devices.

Communication system 22 may be configured to communicatively couple a computer with one or more other machines. The communication system may include wired and/or wireless communication devices compatible with one or more different communication protocols. As non-limiting examples, a communication system may be configured for communication via a wireless telephone network, or a wired or wireless local- or wide-area network. In some embodiments, a communication system may allow a computer to send and/or receive messages to and/or from other devices via a network such as the Internet.

One aspect of this disclosure is directed to a mixed-reality display device comprising an input system, a display, and a graphics processor. The input system is configured to receive a parameter value, the parameter value being one of a plurality of values of a predetermined range receivable by the input system. The display is configured to display virtual image content that adds an augmentation to a real-world environment viewed by a user of the mixed reality display device. The graphics processor is coupled operatively to the input system and to the display. The graphics processor is configured to render the virtual image content so as to variably change the augmentation, to variably change a perceived realism of the real world environment in correlation to the parameter value.

In some implementations, the display device further comprises a user-interface component configured to present on the display device a user-interface element to enable selection of the parameter value. In some implementations, the input system includes one or more of a camera coupled operatively to gesture-recognition componentry and a microphone coupled operatively to voice-recognition componentry. In some implementations, the input system includes a touch sensor. In some implementations, the virtual image content is displayed at a predetermined location of an object sightable by a user of the display device, and the input system is further configured to enable selection of the object from among a plurality of objects sighted by the user. In some implementations, the parameter value is one of three or more values within the range. In some implementations, the display is configured to project a secondary image of the object, in its entirety, and the secondary image is sightable by the user via the display device. In some implementations, the virtual image content is displayed at a predetermined location of an object sightable by a user of the display device. Here, the input system includes a world-facing camera configured to acquire a primary image of the object, and the primary image is provided to the graphics processor. In some implementations, the virtual image content is displayed at a predetermined location of an object in the real-world environment, and the display is configured to superpose the virtual image content on the object, so as to impart a variable unrealistic quality to the object. In some implementations, the display device further comprises a loudspeaker configured to emit audio; and audio-mixing componentry coupled operatively to the input system and to the loudspeaker, the audio-mixing componentry being configured to compose an audio overlay to impart a variable unrealistic quality to real-world environment, the variable unrealistic quality varying relation to the parameter value. In some implementations, the augmentation includes one or more of color, texture, lighting, shadow, opacity, blur, and pixelization of a foreground or background object within the real-world environment. In some implementations, the augmentation is configured to change an aesthetic presentation of an object within the real-world environment, and the parameter value ranges from real aesthetic presentation to fantastical aesthetic presentation. In some implementations, the augmentation is configured to change a virtualized mass and associated kinematics of an object within the real-world environment, and the parameter value ranges from realistic virtualized mass to unrealistic virtualized mass. In some implementations, the augmentation is configured to temporally evolve an appearance of an object within the real-world environment, and the parameter value ranges from a past time to a future time. In some implementations, the augmentation is configured to alter a relational aspect of an object relative to one or more nearby objects in the real-world environment.

Another aspect of this disclosure is directed to a fully immersive, binocular, near-eye display device comprising an input system, a microdisplay, and a graphics processor. The input system is configured to receive a parameter value, the parameter value being one of a plurality of values of a predetermined range receivable by the input system. The microdisplay is configured to display virtual image content at a predetermined location of an object, to form an image of the object sightable by a user of the near-eye display device, the virtual image content adding an augmentation to the object. The graphics processor is coupled operatively to the input system and to the microdisplay. The graphics processor is configured to render the virtual image content so as to variably change the augmentation, to variably change a perceived realism of the object in correlation to the parameter value.

In some implementations, the input system includes a world-facing depth-imaging camera configured to acquire a depth image of the object, and the depth image is provided to the graphics processor.

Another aspect of this disclosure is directed to a near-eye display device comprising an input system, a microdisplay, a loudspeaker, a graphics processor, and audio-mixing componentry. The input system is configured to receive a parameter value, the parameter value being one of a plurality of values of a predetermined range receivable by the input system. The microdisplay is configured to display virtual image content to a predetermined location sightable by a user of the near-eye display device, the virtual image content adding an augmentation to a real-world environment of the user. The loudspeaker is configured to emit audio at the predetermined location. The graphics processor is coupled operatively to the input system and to the microdisplay. The graphics processor is configured to render the virtual image content so as to variably change the augmentation in correlation to the parameter value. The audio-mixing componentry is coupled operatively to the input system and to the loudspeaker. The audio-mixing componentry is configured to compose an audio overlay to impart the variable virtual quality in correlation to the parameter value.

In some implementations, the augmentation is configured to change one or more of loudness and pitch emitted by an object in the predetermined location, and the display device further comprises a position sensor configured to sense a position and orientation of the display device relative to the object. In some implementations, the augmentation is configured to change background imagery in the predetermined location.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A mixed-reality display device comprising:
an input system configured to receive a parameter value, the parameter value being one of a plurality of values of a predetermined range receivable by the input system;
an electronic display configured to display virtual image content that adds an augmentation to a real-world environment viewed by a user of the mixed reality display device, the virtual image content being positioned persistently relative to the real-world environment, the display being configured to superpose the virtual image content on the real-world environment, so as to impart a variable unrealistic quality to the real-world environment; and
a graphics processor coupled operatively to the input system and to the electronic display, the graphics processor being configured to render the virtual image content so as to variably change the augmentation, to variably change a perceived realism of the real world environment in correlation to the parameter value.

2. The display device of claim 1 further comprising a user-interface component configured to present on the display device a user-interface element to enable selection of the parameter value.

3. The display device of claim 1 wherein the input system includes one or more of a camera coupled operatively to gesture-recognition componentry and a microphone coupled operatively to voice-recognition componentry.

4. The display device of claim 1 wherein the input system includes a touch sensor.

5. The display device of claim 1 wherein the virtual image content is displayed at a predetermined location of a fixed object sightable by a user of the display device, and wherein the input system is further configured to enable selection of the object from among a plurality of objects sighted by the user.

6. The display device of claim 1 wherein the parameter value is one of three or more values within the range.

7. The display device of claim 1 wherein the display is configured to project a secondary image of the object, in its entirety, and wherein the secondary image is sightable by the user via the display device.

8. The display device of claim 7 wherein the virtual image content is displayed at a predetermined location of an object sightable by a user of the display device, wherein the input system includes a world-facing camera configured to acquire a primary image of the object, and wherein the primary image is provided to the graphics processor.

9. The display device of claim 1, wherein the virtual image content is displayed at a predetermined location of a moving object in the real-world environment, and wherein the display is configured to superpose the virtual image content on the moving object, so as to impart a variable unrealistic quality to the moving object.

10. The display device of claim 1 further comprising: a loudspeaker configured to emit audio; and audio-mixing componentry coupled operatively to the input system and to the loudspeaker, the audio-mixing componentry being configured to compose an audio overlay to impart a variable unrealistic quality to real-world environment, the variable unrealistic quality varying in relation to the parameter value.

11. The display device of claim 1 wherein the augmentation includes one or more of color, texture, lighting, shadow, opacity, blur, and pixelization of a foreground or background object within the real-world environment.

12. The display device of claim 1 wherein the augmentation is configured to change an aesthetic presentation of an object within the real-world environment, and wherein the parameter value ranges from real aesthetic presentation to fantastical aesthetic presentation.

13. The display device of claim 1 wherein the augmentation is configured to change a virtualized mass and associated kinematics of an object within the real-world environment, and wherein the parameter value ranges from realistic virtualized mass to unrealistic virtualized mass.

14. The display device of claim 1 wherein the augmentation is configured to temporally evolve an appearance of an object within the real-world environment, and wherein the parameter value ranges from a past time to a future time.

15. The display device of claim 1 wherein the augmentation is configured to alter a relational aspect of an object relative to one or more nearby objects in the real-world environment.

16. A fully immersive, binocular, near-eye display device, comprising:
an input system configured to receive a parameter value, the parameter value being one of a plurality of values of a predetermined range receivable by the input system;
an electronic microdisplay configured to position virtual image content persistently relative to a location of an object in a virtual environment, to form an image of the object sightable by a user of the near-eye display device, the virtual image content adding a superposed augmentation to the object; and
a graphics processor coupled operatively to the input system and to the microdisplay, the graphics processor being configured to render the virtual image content so as to variably change the augmentation, to variably change a perceived realism of the object in correlation to the parameter value.

17. The display device of claim 16 wherein the input system includes a world-facing depth-imaging camera configured to acquire a depth image of the object, and wherein the depth image is provided to the graphics processor.

18. A near-eye display device comprising:
an input system configured to receive a parameter value, the parameter value being one of a plurality of values of a predetermined range receivable by the input system;
an electronic microdisplay configured to display virtual image content to a predetermined location sightable by a user of the near-eye display device, the virtual image content being displayed at an observer-invariant location of a fixed or moving real-world object in a real-world environment of the user, wherein the display is configured to superpose the virtual image content on the object, so as to impart a variable unrealistic quality to the object;
a loudspeaker configured to emit audio at the predetermined location;
a graphics processor coupled operatively to the input system and to the microdisplay, the graphics processor being configured to render the virtual image content so as to variably change the augmentation in correlation to the parameter value; and
audio-mixing componentry coupled operatively to the input system and to the loudspeaker, the audio-mixing componentry being configured to compose an audio overlay to impart the variable virtual quality in correlation to the parameter value.

19. The display device of claim 18 wherein the augmentation is configured to change one or more of loudness and pitch emitted by an object in the predetermined location, the display device further comprising a position sensor configured to sense a position and orientation of the display device relative to the object.

20. The display device of claim 18 wherein the augmentation is configured to change background imagery in the predetermined location.

* * * * *